United States Patent
Yoshioka

[11] Patent Number: 5,977,668
[45] Date of Patent: Nov. 2, 1999

[54] VEHICLE ALTERNATOR AND METHOD OF MANUFACTURE THEREFOR

[75] Inventor: Nobuatsu Yoshioka, Tokyo, Japan

[73] Assignee: Mitsubishi Denki Kabushiki Kaisha, Tokyo, Japan

[21] Appl. No.: 09/253,735

[22] Filed: Feb. 22, 1999

[30] Foreign Application Priority Data

Sep. 7, 1998 [JP] Japan ................. 10-252818

[51] Int. Cl.⁶ .................................................. H02K 9/00
[52] U.S. Cl. .................. 310/62; 310/63; 310/263; 310/43
[58] Field of Search ............... 310/263, 43, 62, 310/63, 58, 61, 52

[56] References Cited

U.S. PATENT DOCUMENTS

| | | | |
|---|---|---|---|
| 4,488,070 | 12/1984 | Iwaki et al. ................. | 310/62 |
| 4,757,221 | 7/1988 | Kurihashi et al. ............ | 310/62 |
| 5,021,696 | 6/1991 | Nelson ....................... | 310/62 |
| 5,329,199 | 7/1994 | Yockey et al. .............. | 310/263 |
| 5,561,334 | 10/1996 | Ishida et al. ................ | 310/62 |
| 5,693,992 | 12/1997 | Kurusu et al. .............. | 310/63 |
| 5,705,865 | 1/1998 | Ishida et al. ................ | 310/62 |
| 5,773,906 | 6/1998 | Mukai et al. ............... | 310/232 |
| 5,828,155 | 10/1998 | Adachi ....................... | 310/263 |
| 5,848,461 | 12/1998 | York .......................... | 310/42 |
| 5,903,073 | 5/1999 | Mukai ........................ | 310/269 |

FOREIGN PATENT DOCUMENTS 4-190655   7/1992   Japan .
5-30707    2/1993   Japan .

*Primary Examiner*—Nestor Ramirez
*Assistant Examiner*—Saeed Ghahramani
*Attorney, Agent, or Firm*—Sughrue, Mion, Zinn, MacPeak & Seas, PLLC

[57] ABSTRACT

A vehicle alternator is provided with a metal plate 133a to allow a resin fan 133 to be secured to an end surface of a polar core by welding. The metal plate may comprise an flat annular plate insertion molded into the resin fan, or disks disposed in a circle concentric to the resin fan, which is insertion molded into the resin fan an annular flange portion 343b which clamps the resin fan to the polar core and a cylindrical portion 343a may be provided, or a flange portion 443b and a cylindrical portion 443a may be provided. An annular flange portion 543b which clamps the resin fan to the polar core and a hollow cylindrical portion 543a and a flat annular plate portion 543d which extends radially inwards therefrom may be provided.

14 Claims, 8 Drawing Sheets

VEHICLE ALTERNATOR AND METHOD OF MANUFACTURE THEREFOR

BACKGROUND OF THE INVENTION

1. Field of the Invention

The present invention relates to a vehicle alternator and to a method of manufacture therefor, and in particular to a construction for securing resin fans to polar cores.

2. Description of the Related Art

The vehicle alternator disclosed in Japanese Patent Laid-Open No. (HEI) 5-30707, shown in FIG. 12, is a known example of a conventional vehicle alternator.

In the center of FIG. 12, there are disposed: polar cores 5, 6 of opposite polarity, whose polar tooth portions project alternately in the axial direction around a circumference; a magnetizing coil 7 held between the polar cores 5, 6; a revolving shaft 8 to which the polar cores 5, 6 are secured; and a rotor 4 having a pair of slip rings 9, which are secured to the revolving shaft by means of an insulated sleeve. A stator 1 comprising a stator core 2 and a stator coil 3 is disposed outside the rotor 4.

A front bracket 12 and a rear bracket 13 are disposed outside the stator 1, and the front bracket 12, the rear bracket 13, and the stator core 2 are secured by fastening bolts 14. Air intake openings 12a and air discharge openings 12b are disposed in the front bracket 12 for ventilation, and air intake openings 13a and air discharge openings 13b are disposed in the front bracket 13 also for ventilation, and ventilation occurs in each as shown by the arrows in the figure. The rotating shaft 8 of the rotor 4 is supported in the front bracket 12 and the rear bracket 13 by means of bearings 15, 16. A pulley 17 is secured to one end of the rotating shaft 8, and the revolutions of an engine (not shown) are transmitted to the pulley 17 by means of a belt (not shown), rotating the rotor 4.

A rectifier 18, which converts an alternating current resulting from an alternating voltage induced by the stator coil 3 to a direct current, and a voltage regulator 19, which regulates the terminal voltage of the vehicle alternator at a fixed value by measuring the generated voltage and controlling the magnetizing current, are disposed radially outwards from the slip rings 9. Brushes 21, which are held by brush holders 20, are pushed into contact with the slip rings 9.

Resin fans 33 with resin blades 33a formed integrally in one side thereof are disposed on end surfaces of the polar cores 5, 6. Details of the mounted construction of the resin fans 33 are shown in FIG. 13, which is a cross-section of a side elevation of a circumferential portion of a resin fan 33, and in FIG. 14, which is a front elevation of the circumferential portion of the resin fan 33.

An annular protrusion 33b is formed integrally on an inner circumferential edge of the resin fan 33. Apertures 33c for bolts are disposed radially outwards from the annular protrusion 33b so that the resin fan 33 can be mounted on the end surface of the polar core 5. An annular recess 5b is disposed in the end surface of the polar core 5, and the annular protrusion 33b of the resin fan 33 is inserted therein. Metal braces 34 composed of bent sheet metal are placed axially outwards on the inner circumferential edge of the resin fan 33, the metal braces 34 are secured to the resin fan 33 by bolts 35, and the resin fan 33 is mounted on the end surface of the polar core 5 by bolts 32.

In a vehicle alternator of this kind, when the rotor 4 is rotated, an alternating voltage is induced in the stator coil 3, power is supplied, and heat is generated. The ventilation resulting from the rotation of the resin fans 33 cools the stator 1 and the rotor 4.

On the front bracket 12 side, a cooling ventilation generated by the rotation of the resin fan 33 is taken in through the air intake openings 12a in the front bracket 12, cools the stator 1, and is expelled through the air discharge openings 12b. On the rear bracket side, the cooling ventilation is taken in through the air intake openings 13a in the front bracket 13, cools the rectifier 18, the voltage regulator 19, and the stator 1, and is expelled through the air discharge openings 13b. Resin fans 33 are used here because, compared to sheet metal fans, their shape can be modified easily to improve performance and reduce noise, and their parts are lighter.

However, resin fans suffer from the following problems:

because they are made of resin, welding such as electric resistance welding, etc., cannot be used to secure resin fans to the polar cores of the rotor as it can be with sheet metal fans, and the same welding equipment used to secure sheet metal fans therefore cannot be used on resin fans;

braces and bolts are required, which increases the number of parts; and since the braces have to be fastened with bolts, productivity decreases.

SUMMARY OF THE INVENTION

The present invention aims to solve the above problems and an object of the present invention is to provide a vehicle alternator in which the same welding equipment used to secure sheet metal fans can be used, in which the number of parts during assembly is small, and in which productivity does not decrease because no bolt fastening is required.

The vehicle alternator according to the present invention comprises:

a rotor having polar cores which hold a magnetizing coil which is secured to a rotating shaft; and a resin fan disposed on an end surface of the polar core;

wherein a metal plate is provided to allow the resin fan to be secured to the end surface of the polar cores by welding.

The vehicle alternator according to the present invention is also characterized in that the metal plate may be a flat annular plate insertion molded into the resin fan.

The vehicle alternator according to the present invention is also characterized in that the metal plate may comprise a plurality of disks disposed in a circle concentric to the resin fan, said disks being insertion molded into the resin fan.

The vehicle alternator according to the present invention is also characterized in that the metal plate may comprise:

an annular flange portion which damps the resin fan to the polar core; and a plurality of cylindrical portions disposed in a circle concentric to the flange portion.

The vehicle alternator according to the present invention is also characterized in that the metal plate may comprise:

a flange portion which clamps the resin fan to the polar core; and a cylindrical portion.

The vehicle alternator according to the present invention is also characterized in that the metal plate may comprise:

an annular flange portion which clamps the resin fan to the polar core;

a hollow cylindrical portion having one edge connected perpendicularly to the inner circumferential edge of said flange portion; and a flat annular plate portion connected to the other edge of the hollow cylindrical portion, which extends radially inwards from the hollow cylindrical portion.

The vehicle alternator according to the present invention is also characterized in that the metal plate may be provided with a protrusion to allow the resin fan to be secured to the polar core by electric resistance welding.

The method of manufacture for a vehicle alternator according to the present invention is characterized in that, in a method of manufacture for a vehicle alternator comprising:
- a rotor having polar cores which hold a magnetizing coil which is secured to a rotating shaft; and
- a resin fan disposed on an end surface of the polar core;
- the method of manufacture comprises the steps of:
- securing a metal plate to the resin fan by insertion molding; and
- securing the metal plate to the polar core by welding.

The method of manufacture for a vehicle alternator according to the present invention is characterized in that, in a method of manufacture for a vehicle alternator comprising:
- a rotor having polar cores which hold a magnetizing coil which is secured to a rotating shaft; and
- a resin fan disposed on an end surface of the polar core;
- the method of manufacture comprises the steps of:
  - clamping the resin fan between the metal plate and the polar core; and
  - securing the metal plate to the polar core by welding.

DETAILED DESCRIPTION OF THE PREFERRED EMBODIMENTS

Embodiment 1

Figure 1:
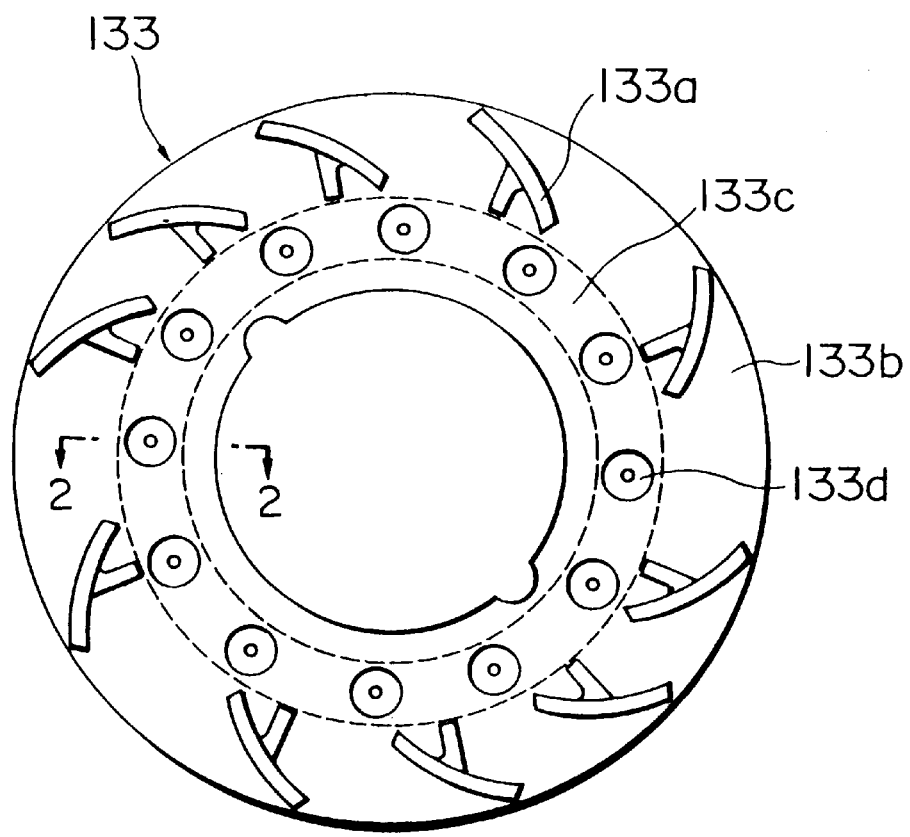
FIG. 1 is a front elevation showing a construction of a resin fan for use in a vehicle alternator according to Embodiment 1 of the present invention.
Figure 2:
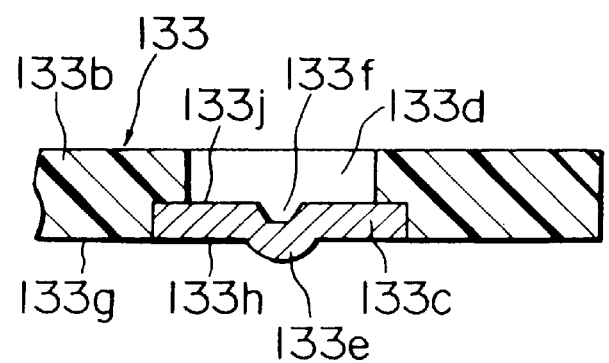
FIG. 2 is a cross-section taken along line 2—2 in FIG. 1.
Figure 3:
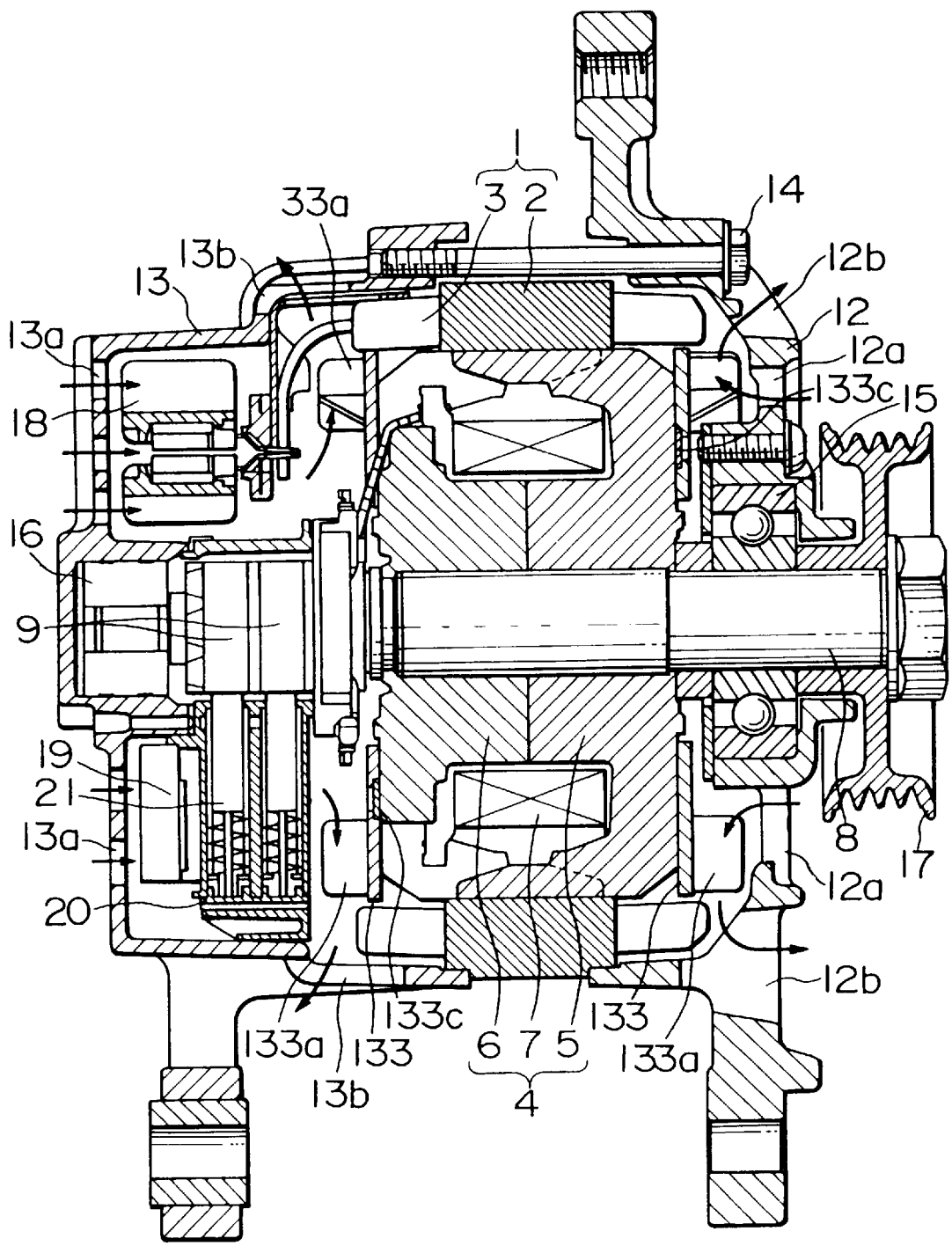
FIG. 3 is a cross-section showing the construction of the vehicle alternator according to Embodiment 1 of the present invention.
Figure 12:
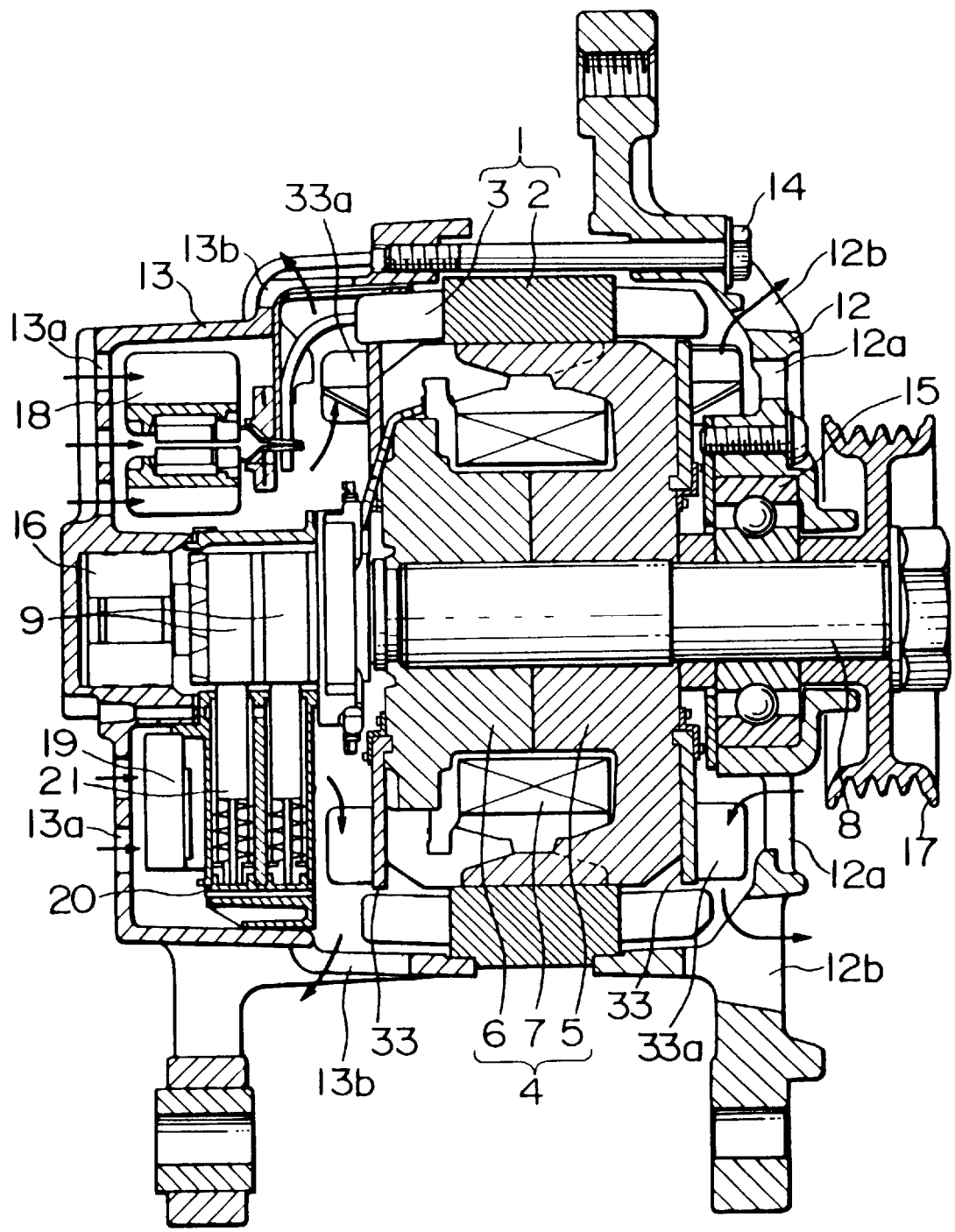
FIG. 12 is a cross-section showing a construction of a conventional vehicle alternator.
Figure 13:
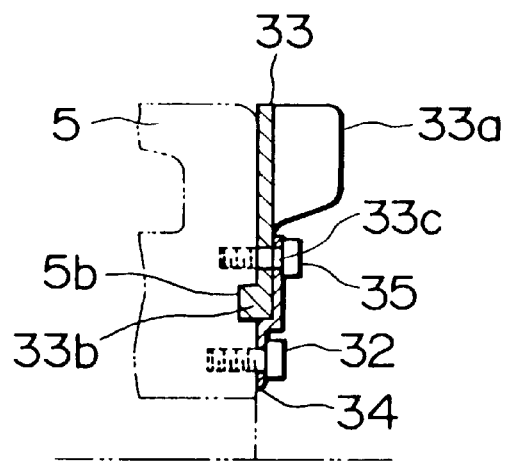
FIG. 13 is a partial cross-section of a side elevation showing a mounted construction of a resin fan for use in the conventional vehicle alternator.
Figure 14:
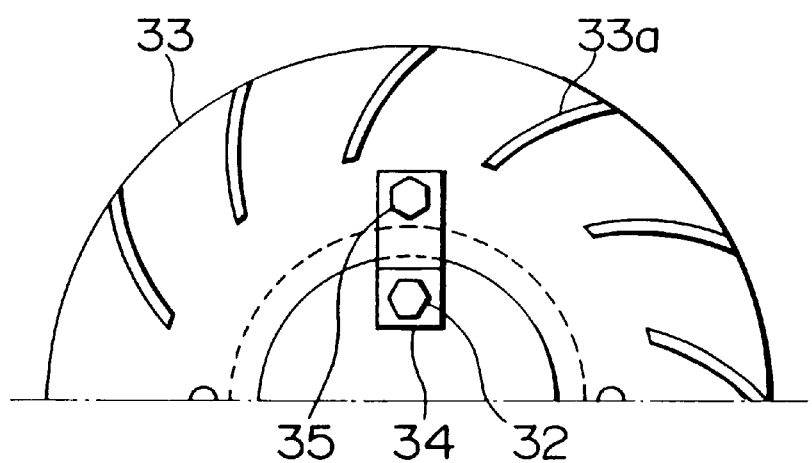
FIG. 14 is a partial front elevation showing the mounted construction of the resin fan for use in the conventional vehicle alternator.

FIG. 1 is a front elevation showing a construction of a resin fan 133 for a vehicle alternator according to an embodiment of the present invention. FIG. 2 is a cross-section taken along line II—II in FIG. 1. FIG. 3 is a cross-section showing the construction of the vehicle alternator according to Embodiment 1 of the present invention. The shape of a resin fan 133 in FIGS. 1 to 3 is different from the resin fan 33 in FIG. 12. Moreover, parts and components which are the same as or equivalent to those in FIG. 12 will be given identical numerals and duplicate explanations will be omitted.

In the resin fan 133 in FIGS. 1 and 2, resin blades 133a are disposed with unequal spacing on one flat surface portion of a fan main body portion 133b comprising a flat hollow cylindrical resin plate in a circle concentric to the fan main body portion 133b. A flat annular metal plate 133c is disposed on the other flat surface portion of the fan main body portion 133b, that is to say, the flat portion 133g which is on the opposite side from the flat portion on which the blades 133a are disposed. Spherical protrusions 133e for electric resistance welding are disposed on one side of the metal plate 133c, and truncated cone-shaped recess portions 133f are disposed on the opposite side coaxial to the protrusions 133e. The protrusion-side flat surface portion 133h, which is the surface on which the protrusions 133e are disposed, is arranged with the protrusions 133e facing outwards so that the protrusion-side flat surface portion 133h lies in the same plane as the flat surface portion 133g of the fan main body portion 133b. Cylindrical apertures 133d are disposed in the fan main body portion 133b so that they are positioned adjacent to the recess portion-side flat surface portion 133j of the metal plate 133c, on which the recess portions 133f are disposed to allow an electric resistance welder (not shown) to come into contact with the metal plate 133c. The sheet metal plate 133c of the resin fan 133, in which the protrusions 133e are disposed by pressing, is formed integrally with the resin fan main body 133b and blades 133a by insertion molding.

In FIG. 3, resin fans 133 are secured by electric resistance welding to end surfaces 5a, 5b of polar cores 5, 6 of a rotor 4, in which the polar cores 5, 6 hold a magnetizing coil 7 secured to a rotating shaft 8.

Moreover, the means for securing the resin fans provided with metal plates insertion molded therein to the polar cores 5, 6 need not be limited to electric resistance welding, and beam welding or laser welding may be used.

Embodiment 2

Figure 4:
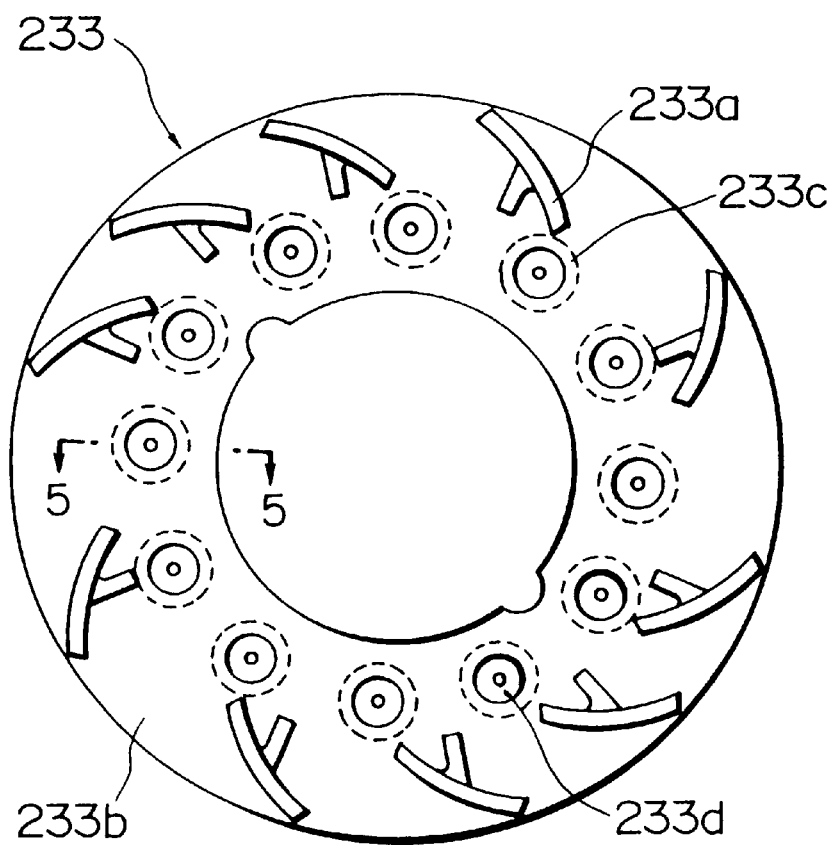
FIG. 4 is a front elevation showing a construction of a resin fan for use in a vehicle alternator according to Embodiment 2 of the present invention.
Figure 5:
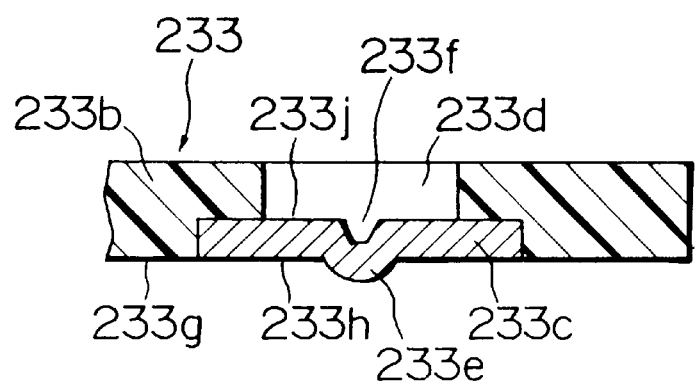
FIG. 5 is a cross-section taken along line 5—5 in FIG. 4.

FIG. 4 is a front elevation showing a construction of a resin fan 233 for a vehicle alternator according to another embodiment of the present invention. FIG. 5 is a cross-section taken along line 5—5 in FIG. 4.

The shape of metal plates 233c in FIGS. 4 to 5 is different from the metal plate 133c in FIGS. 1 to 3.

In the resin fan 233 in FIGS. 4 and 5, resin blades 233a are disposed with unequal spacing on one flat surface portion of a fan main body portion 233b comprising a flat hollow cylindrical resin plate in a circle concentric to the fan main body portion 233b, as with the resin fan 133 in FIGS. 1 and 2. The difference from FIGS. 1 and 2 is that metal plates 233c, which are disposed on the other flat surface portion of the fan main body portion 233b, that is to say, the flat portion 233g which is on the opposite side from the flat portion on which the blades 233a are disposed, are disks. A spherical protrusion 233e is disposed on one side of each of the metal plates 233c, a truncated cone-shaped recess portion 233f is disposed on the opposite side coaxial to the protrusion 233e, and the protrusion-side flat surface portion 233h, which is the surface on which the protrusion 233e is disposed, is arranged with the protrusion 233e facing outwards so that the protrusion-side flat surface portion 233h lies in the same plane as the flat surface portion 233g of the fan main body portion 233b. Cylindrical apertures 233d are disposed in the fan main body portion 233b so that they are adjacent to the recess portion-side flat surface portions 233j of the metal plates 233c on which the recess portions 233f are disposed to allow an electric resistance welder (not shown) to come into contact with the metal plates 233c. The concentrically-disposed metal plates 233c of the resin fan 233 are formed integrally with the resin fan main body 233b and blades 233a by insertion molding.

The metal plates 233c may be disposed in a circle of different diameter depending on the size of the fan. Consequently, the same metal plates 233c can be used, for example, in various resin fans of different diameter.

Embodiment 3

Figure 6:
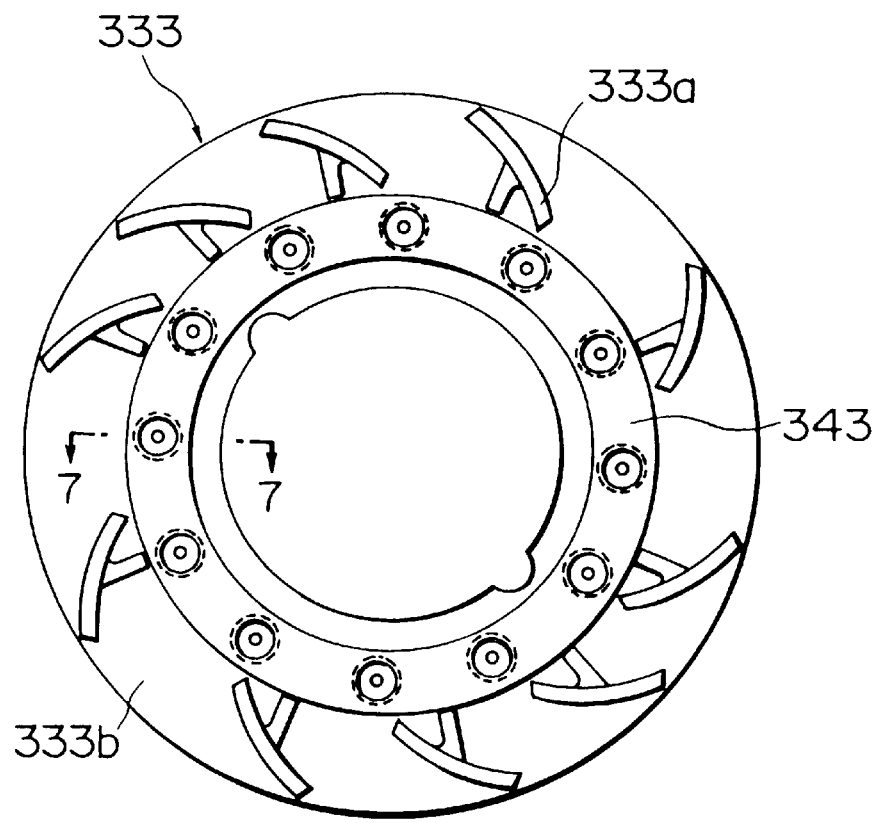
FIG. 6 is a front elevation showing a construction of a resin fan for use in a vehicle alternator according to Embodiment 3 of the present invention.
Figure 7:
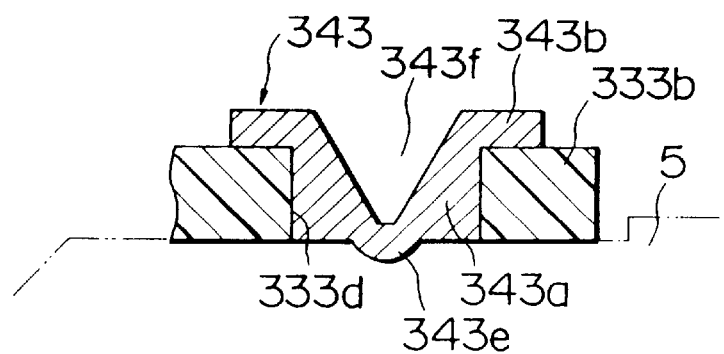
FIG. 7 is a cross-section taken along line 7—7 in FIG. 6.

FIG. 6 is a front elevation showing a construction of a resin fan 333 for a vehicle alternator according to another embodiment of the present invention. FIG. 7 is a cross-section taken along line 7—7 in FIG. 6.

The shape of a metal plate 343 and the resin fan 333 in FIGS. 6 and 7 and the fact that the metal plate 343 is not insertion molded into the resin fan 333 are the differences from the metal plate 133c in FIGS. 1 to 3.

In FIGS. 6 and 7, a metal plate 343 having a flange portion 343b comprising a flat annular plate and cylindrical portions 343a disposed in a circle concentric to the flange portion 343b is disposed radially inwards from blades 333a of the resin fan 333. Truncated cone-shaped recess portions 343f are disposed on the flange 343b side of the metal plate 343, and spherical protrusions 343e for electric resistance welding are disposed on the other side coaxial to the recess portions 343f.

The cylindrical portions 343a of the metal plate 343 are inserted into respective cylindrical apertures 333d in the resin fan 333, and the cylindrical portions 343a are secured to an end surface of a polar core 5 by electric resistance welding so that the resin fan 333 is held between the flange portion 343b and the polar core 5, which is shown by the double-dot-and-dash line in FIG. 7.

Embodiment 4

Figure 8:
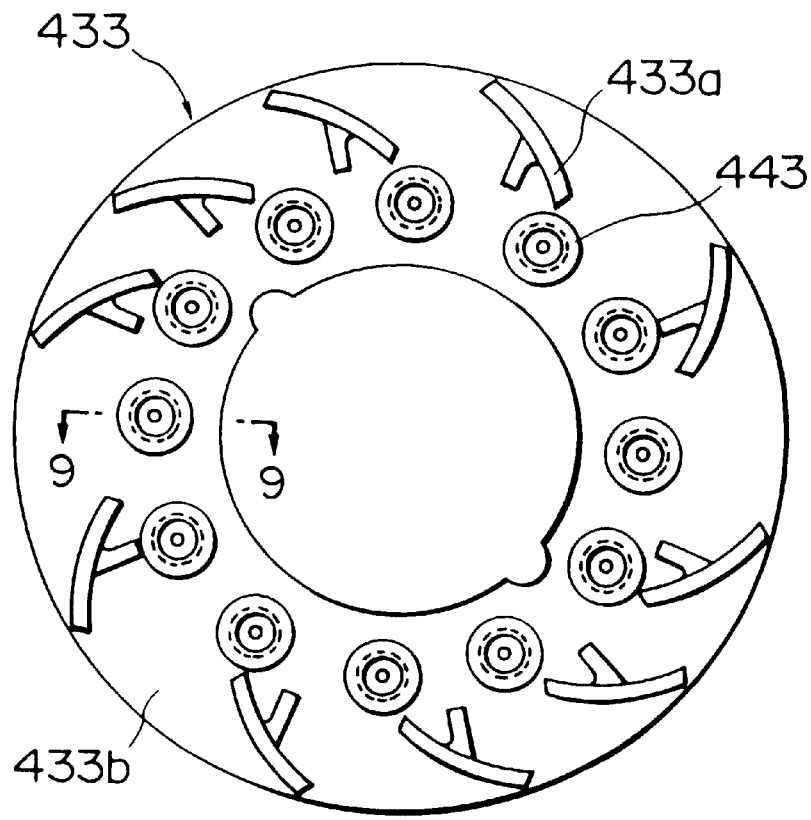
FIG. 8 is a front elevation showing a construction of a resin fan for use in a vehicle alternator according to Embodiment 4 of the present invention.
Figure 9:
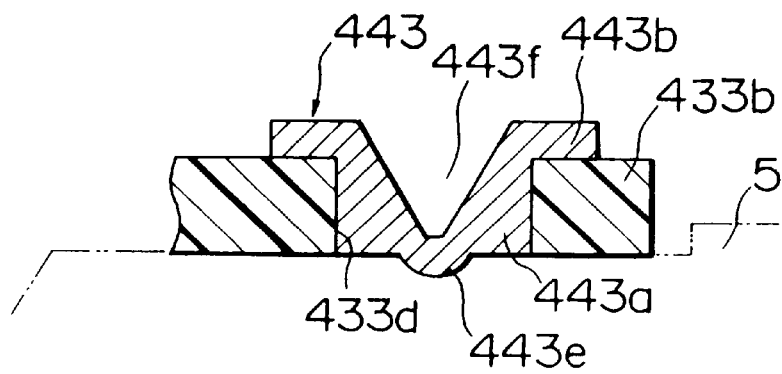
FIG. 9 is a cross-section taken along line 9—9 in FIG. 8.

FIG. 8 is a front elevation showing a construction of a resin fan 433 for a vehicle alternator according to another embodiment of the present invention. FIG. 9 is a cross-section taken along line 9—9 in FIG. 8.

The shape of metal plates 443 and the resin fan 433 in FIGS. 8 and 9 and the fact that the metal plates 443 are not insertion molded into the resin fan 433 are the differences from the metal plates 233c in FIGS. 4 to 5.

In FIGS. 8 and 9, cylindrical apertures 433d are disposed in a fan main body portion 433b of the resin fan 433 in a circle concentric to the fan main body portion 433b. The metal plates 443 each comprising a disk-shaped flange portion 443b and a cylindrical portion 443a are arranged in each of the cylindrical apertures 433d. A truncated cone-shaped recess portion 443f is disposed on the flange 443b side of each of the metal plates 443, and a spherical protrusion 443e for electric resistance welding is disposed on the other side coaxial to the recess portion 443f. The cylindrical portions 443a of the metal plates 443 are inserted into the respective cylindrical apertures 433d in the resin fan 433, and the cylindrical portions 443a are secured to an end surface of a polar core 5 by electric resistance welding so that the resin fan 433 is held between the flange portions 443b and the polar core 5, which is shown by the double-dot-and-dash line in FIG. 9.

In this embodiment of the present invention, the metal plates 443 are disposed in a circle concentric to the fan main body portion 433b, but the spacing and diameter of the circle on which the metal plates 443 are disposed can easily be changed to fit the shape of the resin fan, and further, there is no need for the metal plates 443 to be disposed in a circle concentric to the fan main body portion 433b, and any appropriate arrangement may be used to fit the shape of the resin fan.

Embodiment 5

Figure 10:
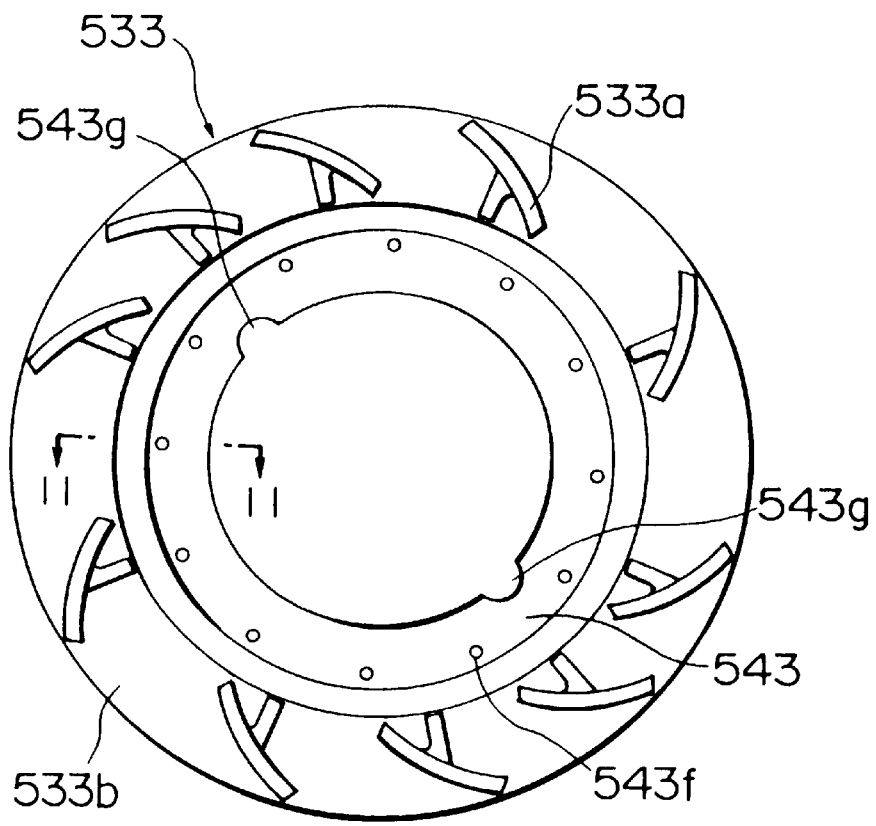
FIG. 10 is a front elevation showing a construction of a resin fan for use in a vehicle alternator according to Embodiment 5 of the present invention.
Figure 11:
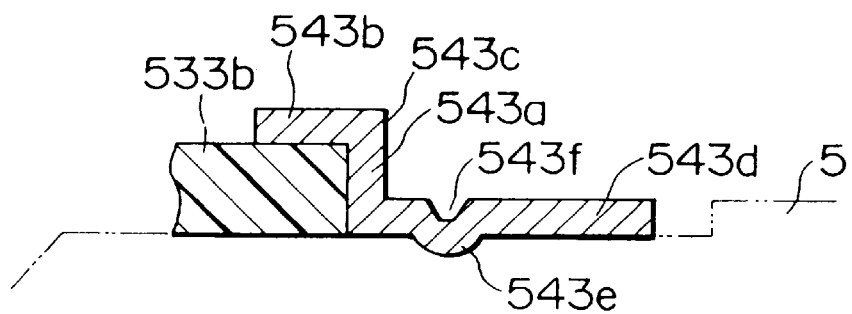
FIG. 11 is a cross-section taken along line 11—11 in FIG. 10.

FIG. 10 is a front elevation showing a construction of a resin fan 533 for a vehicle alternator according to another embodiment of the present invention. FIG. 11 is a cross-section taken along line 11—11 in FIG. 10.

The shape of a metal plate 543 in FIGS. 10 and 11 is different from the annular metal plate 343 in FIGS. 6 and 7.

In FIGS. 10 and 11, the metal plate 543 is disposed radially inwards from blades 533a of a resin fan 533 and comprises: a flange portion 543b comprising a flat annular plate; a hollow cylindrical portion 543a having one edge connected perpendicularly to the inner circumferential edge 543c of the flange portion 543b; and a flat annular plate portion 543d connected to the other edge of the hollow cylindrical portion 543a, which extends radially inwards from the hollow cylindrical portion 543a. Truncated cone-shaped recess portions 543f are disposed on a flat surface on the flange 543b side of the flat annular plate portion 543d of the metal plate 543, and spherical protrusions 543e for electric resistance welding are disposed on the other side coaxial to the recess portions 543f.

The inner circumferential surface of a fan main body portion 533b of the resin fan 533 is positioned adjacent to the outer circumferential surface of the hollow cylindrical portion 543a, and the spherical protrusions 543e are secured to an end surface of a polar core 5 by electric resistance welding so that the fan main body portion 533b is held between the flange portion 343b and the polar core 5, which is shown by the -double-dot-and-dash line in FIG. 11.

In this embodiment of the vehicle alternator according to the present invention, semicircular recess portions 543g are formed in the metal plate 543 to position the weld position recess portions 543f and the electric resistance welder (not shown) during electric resistance welding. However, the positional relationship between the recess portions 543g and the resin fan 533, which has unevenly spaced blades 533a, is not fixed in the circumferential direction, and therefore the positional relationship of the blades of the resin fans disposed on both ends of the polar cores 5, 6 can be freely set, making it easier to arrange the resin fans so as to reduce noise.

The vehicle alternator according to the present invention comprises:
　　a rotor having polar cores which hold a magnetizing coil which is secured to a rotating shaft; and
　　resin fans disposed on end surfaces of the polar cores;
　　wherein a metal plate is provided to allow the resin fan to be secured to the end surface of the polar cores by welding;
　　thereby enabling the resin fan to be secured to the polar core by welding of the metal plate and also enabling use of the same welding equipment used to secure a sheet metal fan to a polar core.

According to the vehicle alternator of the present invention, the metal plate may be flat annular plate insertion molded into the resin fan, thereby reducing the number of parts during assembly, and avoiding decreased productivity because no bolt fastening is required.

According to the vehicle alternator of the present invention, the metal plate may comprise a plurality of disks disposed in a circle concentric to the resin fan, enabling use of the same metal plate in various resin fans of different diameter, and also reducing the number of parts during assembly and avoiding decreased productivity because no bolt fastening is required.

According to the vehicle alternator of the present invention, the metal plate may comprise:

an annular flange portion which clamps the resin fan to the polar core; and a plurality of cylindrical portions disposed in a circle concentric to the flange portion;

thereby reducing the number of parts during assembly, and avoiding decreased productivity because no bolt fastening is required.

According to the vehicle alternator of the present invention, the metal plate may comprise:

a flange portion which clamps the resin fan to the polar core; and a cylindrical portion;

thereby enabling use of the same metal plate in various resin fans of different diameter, and also reducing the number of parts during assembly and avoiding decreased productivity because no bolt fastening is required.

According to the vehicle alternator of the present invention, the metal plate may comprise:

an annular flange portion which clamps the resin fan to the polar core;

a hollow cylindrical portion having one edge connected perpendicularly to the inner circumferential edge of said flange portion; and a flat annular plate portion connected to the other edge of the hollow cylindrical portion, which extends radially inwards from the hollow cylindrical portion;

and therefore the positional relationship between the recess portions and the resin fan, which has unequally spaced blades, is not fixed in the circumferential direction, enabling the positional relationship of the blades of the resin fans disposed on both ends of the polar cores to be freely set, and making it easier to arrange the resin fans so as to reduce noise.

According to the vehicle alternator of the present invention, the metal plate may be provided with a protrusion to allow the resin fan to be secured to the polar core by electric resistance welding, thereby enabling the resin fan to be secured to the polar core by welding of the metal plate and also enabling use of the same welding equipment used to secure a sheet metal fan to a polar cores.

According to the method of manufacture for a vehicle alternator according to the present invention, in a method of manufacture for a vehicle alternator comprising:

a rotor having polar cores which hold a magnetizing coil which is secured to a rotating shaft; and a resin fan disposed on an end surface of the polar core;

the method of manufacture comprises the step of securing metal plate to the resin fan by insertion molding, and therefore the metal plate is already insertion molded into the resin fan, thereby reducing the number of parts during assembly and avoiding decreased productivity because no bolt fastening is required. The method of manufacture also comprises the step of securing the metal plate to the polar core by welding, thereby enabling use of the same welding equipment used to secure a sheet metal fan to polar core.

According to the method of manufacture for a vehicle alternator according to the present invention, in a method of manufacture for a vehicle alternator comprising:

a rotor having polar cores which hold a magnetizing coil which is secured to a rotating shaft; and a resin fan disposed on an end surface of the polar core;

the method of manufacture comprises the step of clamping the resin fan between the metal plate and the polar core, thereby reducing the number of parts during assembly and avoiding decreased productivity because no bolt fastening is required. The method of manufacture also comprises the step of securing the metal plate to the polar core by welding, thereby enabling use of the same welding equipment used to secure a sheet metal fan to a polar core.

What is claimed is:

1. A vehicle alternator comprising:

a rotor having polar cores which hold a magnetizing coil which is secured to a rotating shaft; and a resin fan disposed on an end surface of said polar core;

wherein a metal plate is provided to allow said resin fan to be secured to said end surface of said polar core by welding.

2. The vehicle alternator according to claim 1, wherein said metal plate is provided with a protrusion to allow said resin fan to be secured to said polar core by electric resistance welding.

3. The vehicle alternator according to claim 1, wherein said metal plate is a flat annular plate insertion molded into said resin fan.

4. The vehicle alternator according to claim 3, wherein said metal plate is provided with a protrusion to allow said resin fan to be secured to said polar core by electric resistance welding.

5. The vehicle alternator according to claim 1, wherein said metal plate comprises a plurality of disks disposed in a circle concentric to said resin fan, said disks being insertion molded into said resin fan.

6. The vehicle alternator according to claim 5, wherein said metal plate is provided with a protrusion to allow said resin fan to be secured to said polar core by electric resistance welding.

7. The vehicle alternator according to claim 1, wherein said metal plate comprises:

an annular flange portion which damps said resin fan to said polar core; and a plurality of cylindrical portions disposed in a circle concentric to said flange portion.

8. The vehicle alternator according to claim 7, wherein said metal plate is provided with a protrusion to allow said resin fan to be secured to said polar core by electric resistance welding.

9. The vehicle alternator according to claim 1, wherein said metal plate comprises:

a flange portion which clamps said resin fan to said polar core; and a cylindrical portion.

10. The vehicle alternator according to claim 9, wherein said metal plate is provided with a protrusion to allow said resin fan to be secured to said polar core by electric resistance welding.

11. The vehicle alternator according to claim 1, wherein said metal plate comprise:

an annular flange portion which clamps said resin fan to said polar core;

a hollow cylindrical portion having one edge connected perpendicularly to the inner circumferential edge of said flange portion; and a flat annular plate portion connected to the other edge of said hollow cylindrical portion, which extends radially inwards from said hollow cylindrical portion.

12. The vehicle alternator according to claim 11, wherein said metal plate is provided with a protrusion to allow said resin fan to be secured to said polar core by electric resistance welding.

13. A method of manufacture for a vehicle alternator comprising:

a rotor having polar cores which hold a magnetizing coil which is secured to a rotating shaft; and a resin fan disposed on an end surface of said polar cores;

wherein said method of manufacture comprises the steps of:

securing a metal plate to said resin fan by insertion molding; and securing said metal plate to said polar core by welding.

14. A method of manufacture for a vehicle alternator comprising:

a rotor having polar cores which hold a magnetizing coil which is secured to a rotating shaft; and a resin fan disposed on an end surface of said polar cores;

wherein said method of manufacture comprises the steps of:

clamping said resin fan between a metal plate and said polar core; and securing said metal plate to said polar core by welding.

* * * * *